United States Patent
Wallin et al.

(10) Patent No.: US 10,436,355 B2
(45) Date of Patent: Oct. 8, 2019

(54) DUCT AND METHOD FOR ITS MANUFACTURE

(71) Applicant: CLIMATE RECOVERY IND AB, Kalmar (SE)

(72) Inventors: Peter Wallin, Kalmar (SE); Göran Bernhardsson, Stockholm (SE)

(73) Assignee: CLIMATE RECOVERY IND AB, Kalmar (SE)

( * ) Notice: Subject to any disclaimer, the term of this patent is extended or adjusted under 35 U.S.C. 154(b) by 78 days.

(21) Appl. No.: 15/555,522

(22) PCT Filed: Mar. 4, 2016

(86) PCT No.: PCT/SE2016/050171
§ 371 (c)(1),
(2) Date: Sep. 4, 2017

(87) PCT Pub. No.: WO2016/144236
PCT Pub. Date: Sep. 15, 2016

(65) Prior Publication Data
US 2018/0051833 A1  Feb. 22, 2018

(30) Foreign Application Priority Data
Mar. 6, 2015 (SE) .................................... 1550277

(51) Int. Cl.
*F16L 11/11* (2006.01)
*F16L 11/12* (2006.01)
(Continued)

(52) U.S. Cl.
CPC .......... *F16L 11/121* (2013.01); *B29C 59/007* (2013.01); *B29C 59/02* (2013.01);
(Continued)

(58) Field of Classification Search
CPC ............................. F16L 11/121; B29C 59/007
(Continued)

(56) References Cited

U.S. PATENT DOCUMENTS 2,371,556 A  3/1945 Steffens et al.
2,821,896 A  2/1958 Kice et al.
(Continued)

FOREIGN PATENT DOCUMENTS

EP  0952306 A1  10/1999
EP  2458295 A1  5/2012
(Continued)

OTHER PUBLICATIONS

European Search Report (Mar. 7, 2018) for corresponding European App. EP 16 76 2056.
(Continued)

*Primary Examiner* — Patrick F Brinson
(74) *Attorney, Agent, or Firm* — WRB-IP LLP

(57) ABSTRACT

A duct of fiber material and binder agent, at least two fold lines are present lengthwise for providing a foldability of the duct by weakened material along the fold lines. The duct is pushable into a folded state and the material remembers the original shape and return to its original shape when released from a folded state. A method of manufacturing a duct: applying a web of origin fiber material with binder agent to a core and compressing the web by an outside form under the influence of heat against the core, wherein the core and/or the outside form is provided with a number of lengthwise ridges corresponding to the desired number of fold lines, to a third of the original thickness of the sides and at the ridges a tenth to a twentieth of the original thickness, and in that the fiber and binder agent web weighs 1.5-3 kg/m².

10 Claims, 3 Drawing Sheets

(51) Int. Cl.
*B29C 59/02* (2006.01)
*B29C 59/00* (2006.01)
*F24F 13/02* (2006.01)
*B29C 61/06* (2006.01)
*B29C 70/32* (2006.01)
*B29D 23/00* (2006.01)
*B29C 53/56* (2006.01)

(52) U.S. Cl.
CPC .............. *B29C 61/06* (2013.01); *B29C 70/32* (2013.01); *B29C 70/326* (2013.01); *F24F 13/0245* (2013.01); *F24F 13/0272* (2013.01); *B29C 53/56* (2013.01); *B29D 23/00* (2013.01)

(58) Field of Classification Search
USPC ......... 138/118, 177, DIG. 11; 428/36.3, 36.4
See application file for complete search history.

(56) References Cited

U.S. PATENT DOCUMENTS

| | | | | |
|---|---|---|---|---|
| 3,201,861 | A * | 8/1965 | Fromson | B21C 37/14 138/114 |
| 3,508,587 | A * | 4/1970 | Mauch | F16L 11/121 138/119 |
| 4,446,891 | A * | 5/1984 | Gebelius | B21D 39/042 138/97 |
| 4,723,579 | A * | 2/1988 | Hyodo | B29C 63/343 138/119 |
| 5,224,796 | A * | 7/1993 | Zeman | A01G 25/02 138/115 |
| 5,385,173 | A * | 1/1995 | Gargiulo | E03F 3/06 138/118 |
| 5,487,411 | A * | 1/1996 | Goncalves | F16L 55/165 138/97 |
| 5,698,056 | A * | 12/1997 | Kamiyama | B29C 65/5042 138/98 |
| 5,934,332 | A * | 8/1999 | Rodriguez | B29C 53/086 138/119 |
| 6,532,574 | B1 * | 3/2003 | Durham | G06F 1/10 327/292 |
| 6,723,266 | B1 * | 4/2004 | Lippiatt | B29C 53/086 264/173.17 |
| 6,857,451 | B1 * | 2/2005 | Connor | B29C 63/343 138/98 |
| 7,708,033 | B2 * | 5/2010 | Tanaka | F16L 55/1656 138/97 |

FOREIGN PATENT DOCUMENTS

| | | |
|---|---|---|
| ES | 2286913 A1 | 12/2007 |
| GB | 2156473 A | 10/1985 |
| WO | 03031771 A1 | 4/2003 |
| WO | 2007017836 A1 | 2/2007 |
| WO | 2009145698 A1 | 12/2009 |
| WO | 2013043100 A1 | 3/2013 |
| WO | 2013043101 A1 | 3/2013 |

OTHER PUBLICATIONS

International Search Report (dated Jul. 1, 2016) for corresponding International App. PCT/SE2016/050171.

* cited by examiner

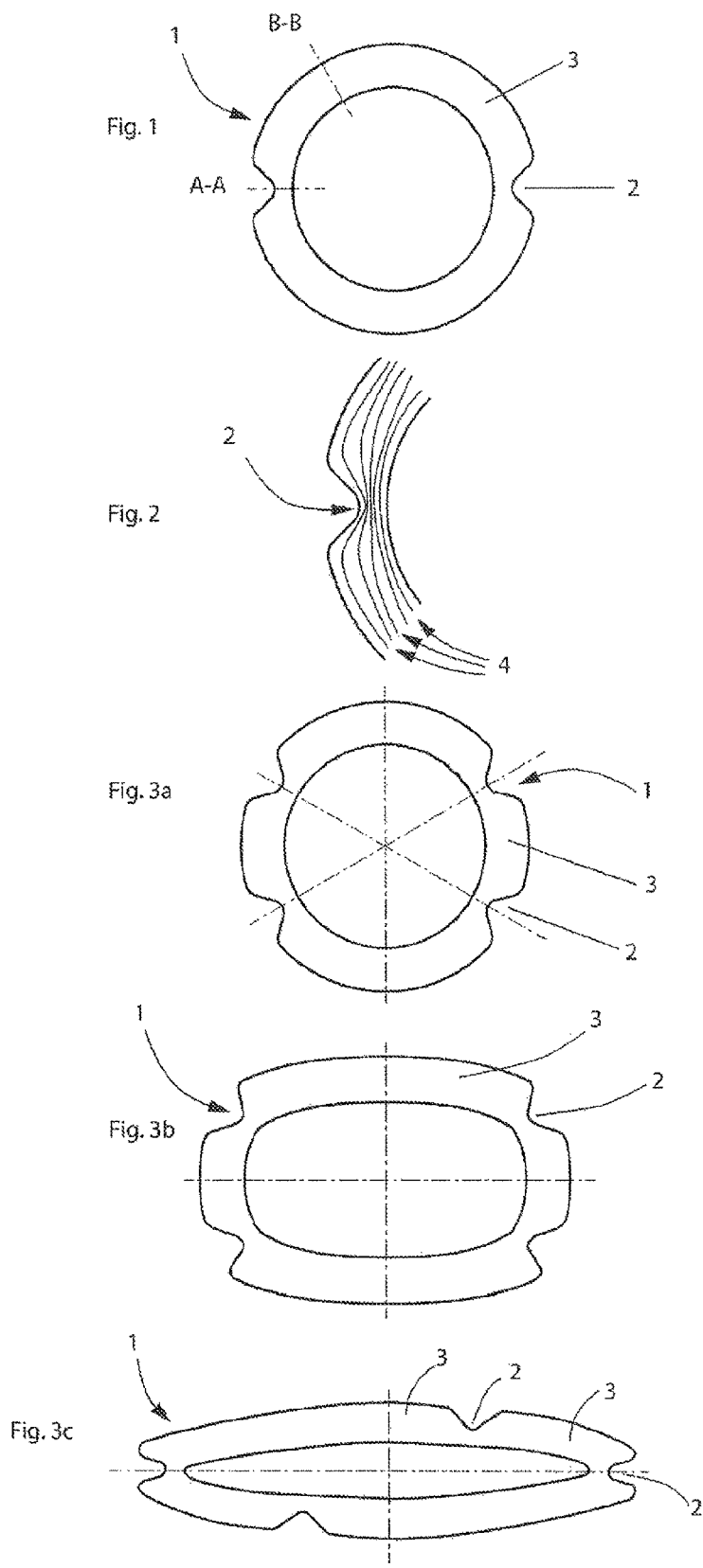

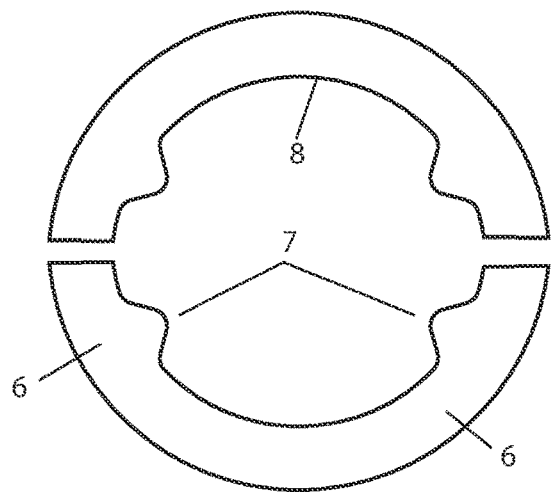
Fig. 5a
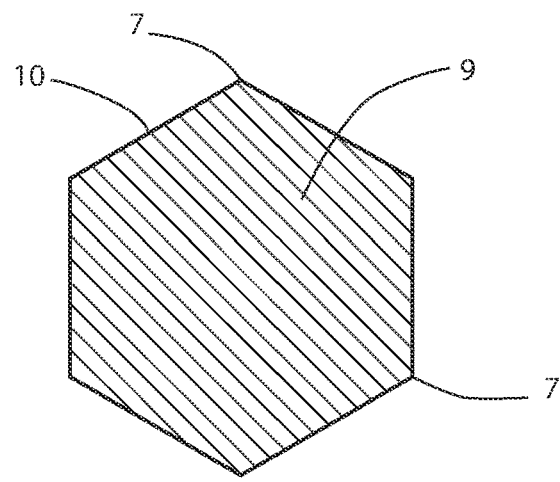
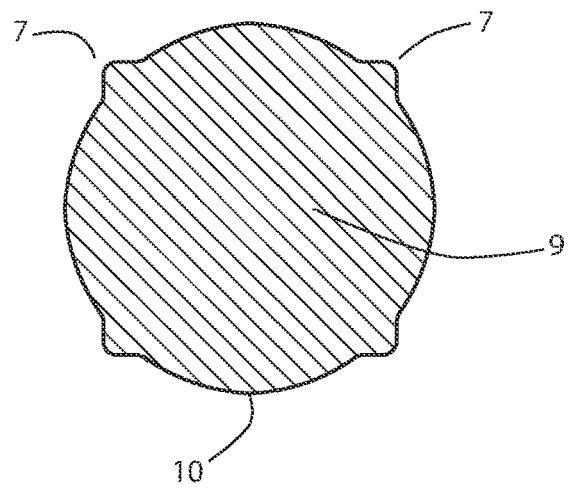
Fig. 5b

DUCT AND METHOD FOR ITS MANUFACTURE

TECHNICAL FIELD

The present invention relates to a duct, at least partly produced from fibre material and binder agent, making up an elongated, circumferentially closed flow space in its original and use state, wherein at least two fold lines are present lengthwise in order to provide a foldability to the duct.

BACKGROUND ART

Higher demands are placed on ventilation ducts when it comes to large cross sectional areas with low flow resistance and withstanding sub pressure. Another demand is to fulfil requirements for fire resistance classification. A further demand is a high level of insulation capability, especially when the duct is used for heating or air conditioning purposes. Additionally there are economical demands on decreased costs for manufacturing, storing, transporting and installation.

From the same applicant the basic technology is known, see WO 2013/043100 and WO 20133/043101.

SUMMARY OF THE INVENTION

An object of the present invention is to provide a non-metallic duct and a method of its manufacture that aim to meet the higher demands on ducts. For instance an object is to provide a duct comprising fibre material, such as glass or stone fibres, and binder agent that is cost effective and easy to store, transport and install. Another object is to provide a fire resistant and unburnable duct classified in a high level class. A further object is to provide a high level insulated duct.

According to a first aspect of the present invention a duct is provided, which at least partly is produced from fibre material and binder agent making up an elongated flow space in its original and use state. At least two fold lines are present lengthwise in order to provide a foldability of the duct by means of weakened material along the fold lines. The duct is pushable into a folded state and the material remembers the original shape and state and thus expand and return to its original shape and state when released from a folded state.

According to one embodiment of the present invention the duct has a main cross sectional shape which is circular in the original state.

According to another embodiment of the present invention weakened material along the fold lines comprises a partial amount of intact fibre material compared to the fibre material in the adjacent sides. This can be accomplished by for example the fact that the weakened material along the fold line comprises a partial amount of pressed and crushed fibre material and a partial amount of intact fibre material compared to the fibre material in the adjacent sides, or that the weakened material along the fold line lacks fibre material in comparison with the fibre material in the adjacent sides, for example by means of lengthwise notches, inside and/or outside, or lengthwise voids so that the amount of intact fibres corresponds to a part of the fibre material in the adjacent sides.

According to one embodiment the amount of intact fibres is at least 20-70% in the weakened material along the fold lines, preferably 30-60% and most preferred 40-50% compared to the fibre material in the adjacent sides.

According to a further embodiment the duct is pushable into an intermediate shape having four sides folded in at least four fold lines. For example, the cross sectional shape is rectangular, and preferably the fold lines are positioned with 60°, 120°, 60° and 120°, respectively, from each other, around the circular original shape. It is also conceivable to have six fold lines, preferably with 60° in between.

According to an embodiment of the present invention the fibre material with binder agent has a surface weight between 1.5-3 kg/m².

According to a further embodiment of the present invention the origin fibre material with binder agent is compressible under the influence of heat so that the sides are compressed to about a third of the thickness of the origin fibre material with binder agent. Additionally, the origin fibre material with binder agent may be compressible under the influence of heat so that the fold lines are compressed to a tenth to a twentieth of the thickness of the origin fibre material with binder agent.

According to an embodiment of the present invention the fibre material is glass or stone fibre material and the amount of binder agent is between 4-8% by weight.

Preferably, in order to provide a sealed duct which would withstand fire and heat according to high level class fire requirements, the duct may be laminated on the inside and/or outside, preferably at least on the inside but also on the outside. The foil used is preferably comprising at least one layer of metal and at least one layer of polymer.

According to an embodiment the foil laminated to the fibre duct is comprising an outer layer of aluminium, an intermediate layer of a thermoplastic polymer having a melt point lower than polyethylene terephthalate (PET), an intermediate layer of polyethylene terephthalate (PET), and an inner layer of a thermoplastic polymer having a melt point lower than polyethylene terephthalate (PET). According to this embodiment a duct is provided which withstands not only fire and heat but also the foil adheres to the fibre duct even when it is repeatedly folded and unfolded. This foil is also good at withstanding cracking during repeated folding and unfolding. Preferably the thermoplastic polymer having a melt point lower than polyethylene terephthalate (PET) is polyethylene (PE).

According to a second aspect of the present invention a method of manufacturing a duct is provided, comprising the steps: winding or applying at least one web of origin fibre material with binder agent to a longitudinal core so that a tubular configuration is formed and then compressing it between the core and an outside form under the influence of heat. The core or the outside form is provided with a number of lengthwise ridges corresponding to the desired number of fold lines for providing the fold lines during compression, and the web is compressed to a third of the original thickness so that the compression at the ridges makes the thickness of the web a tenth to a twentieth of the original thickness, and in that the fibre and binder agent web weighs 1.5-3 kg/m².

According to one embodiment the method comprises the step of bonding the fibres by means of the binder agent at a temperature range of 120-200° C.

According a further embodiment the method comprises the step of crushing the fibres along the ridges, further weakening the material in the fold lines. This may preferably be done during a phase of stripping the duct from the core. For example, wheels may run along the fold lines, crushing fibres by pressing against the fold lines of the duct. An anvil is preferably arranged on the opposite side of the fold line of the duct.

Preferably every wheel has an anvil, the wheel being positioned on the inside of the duct and the anvil on the outside, although the opposite is also conceivable.

The solution according to the present invention is an enhancement of the basic technology previously made by the present applicant. A new property is provided where the duct is manufactured to its original and use state, pushable into a folded state and then return to its original and use state upon release of the forces retaining the duct in the folded state.

Thus a cost effective storing and transporting is made possible due to the FOLDED, flat state and an exceptional easy installation is provided since the duct will directly return to its original and use state, "pop-up", as soon as it is released from for example a packaging keeping it folded. The duct will also stay in its original and use state during fitting and will not need to be stabilised during the fitting as previously known foldable ducts.

The fibre material is provided with a "memory" during the manufacture so that it will always urge to be in its original state. Previously known foldable ducts need to be raised into use state, i.e. forces are needed to keep the previous foldable ducts to retain its raised use state. The present invention works the opposite way. It will keep its original state and forces are needed to keep the inventive duct in the folded state.

BRIEF DESCRIPTION OF THE DRAWINGS

The present invention will now be described in detail under reference to the accompanying drawings, in which FIG. 1 shows an embodiment of a duct according to the present invention in a cross sectional view.

FIG. 2 shows a detail of FIG. 1.

FIG. 3a, b, c shows an embodiment of a duct according to the present invention showing the duct in original state, intermediate state and folded state.

FIGS. 5a and b shows an embodiment of an outer form used in a method according to the invention and two embodiments of a core, respectively.

DETAILED DESCRIPTION OF EMBODIMENTS

In FIG. 1 an embodiment of a duct 1 according to the present invention is shown in a cross sectional view showing two fold lines 2 and thicker sides 3 in between the fold lines 2. The duct is produced, at least partly, of fibres and binder agent, which is compressed under the influence of heat into the form shown in FIG. 1. Of course many different cross sections are possible.

In FIG. 2 a closer detail of FIG. 1 is shown where the thickness in the fold line 2 and the thicker side 3 is shown at A-A and B-B, respectively. Lines 4 are indicating fibres and layers of fibres making up the wall of the duct.

In FIG. 3a, b and c an embodiment of an inventive duct is shown in three different states. In the shown embodiment the weakened fold lines 2 are arranged on the outside of the duct 1. In the shown embodiment the fold lines 2 are positioned with 60°, 120°, 60° and 120°, respectively, from each other, around the circular original shape. In FIG. 3a the duct 1 is in its original state, which also may be a use state, having a circular cross section.

In FIG. 3b the duct 1 is in an intermediate state, a use state, having a more or less rectangular cross section. To retain in this intermediate state the duct 1 needs to be supported by some kind of installation arrangement (not shown) which expose the duct to pushing forces along the longer sides.

In FIG. 3c the duct 1 is in a folded state. In order to get there, in the shown case, the duct needs to be pushed and slightly slid into position. To stay in the folded state the pushing forces must be retained. This may for example be provided by means of a suitable bag of a flat shape (not shown). Preferably, the air is evacuated, too, from the bag in order to keep the folded state.

Figure 4A:
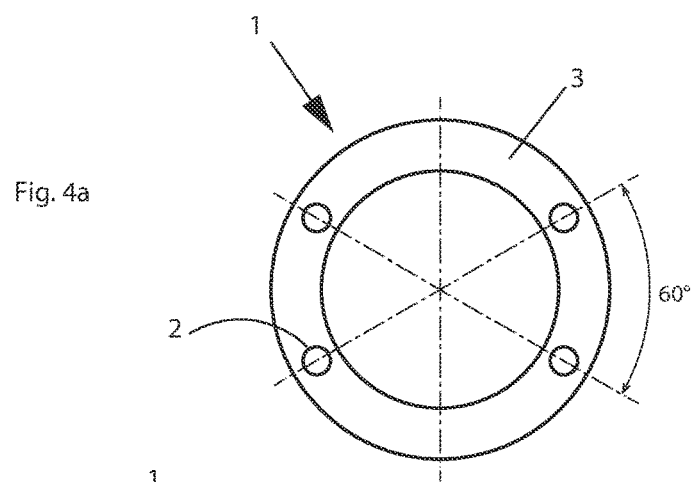
FIG. 4 shows another embodiment of a duct according to the present invention showing the duct in original state, intermediate state and folded state.
Figure 4B:
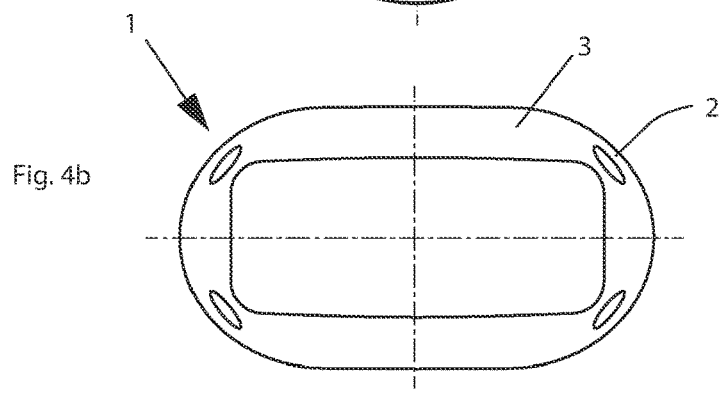
Figure 4C:
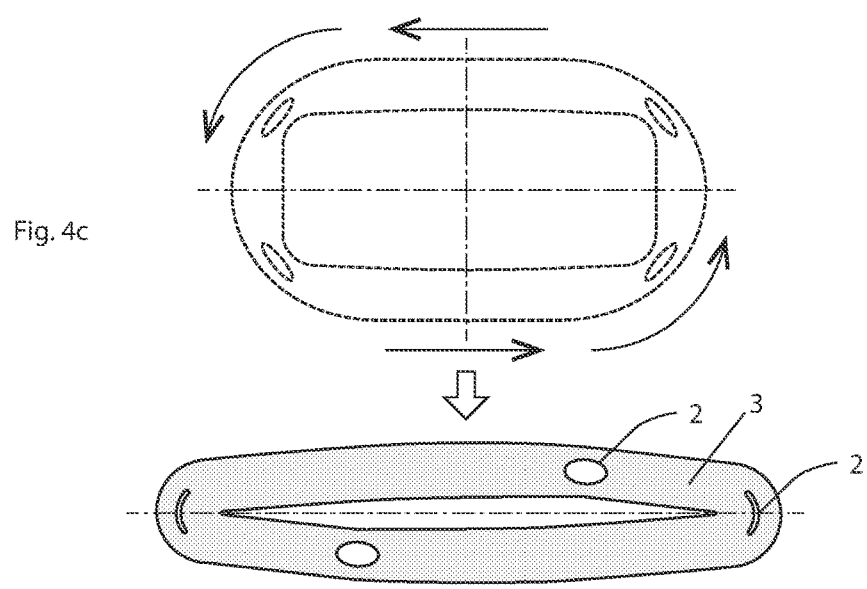

In FIG. 4a, b and c another embodiment of a duct 1 is shown in three different states, in original state, intermediate state and folded state, respectively. In this embodiment the weakening making up the fold lines 2 are provided be means of using less fibres along the fold lines 2. In the shown embodiment this is arranged by means of lengthwise voids 5.

In FIG. 5a one embodiment of an outer form 6 having lengthwise ridges 7 provided on the inside 8 shown in a cross sectional view. The number of ridges 7 will correspond to the number of weakened fold lines 2 provided in the produced duct 1. Two embodiments of a core 9 having lengthwise ridges 7 on the outside 10 is shown in a cross sectional view in FIG. 5b.

An embodiment of a method of producing a duct according to the invention comprises arranging or winding at least one layer of a web of fibres with binder agent around the core 9 until a suitable thickness and density is reached. Preferable the weight is 1.5-3 kg/m$^2$. The fibres could be glass or stone fibres, for example. The binder agent may be phenol based and the amount is preferably 4-8% by weight. It is also possible to first provide a foil around the core 9 and thereafter winding the web of fibres onto the core 9.

Thereafter the outer form 6 is arranged around the core 9 and the web of fibres and binder agent arranged outside the core 9. The fibres and binder agent are compressed between the outer form 6 and the core 9 under the influence of heat, preferably between 120-200° C. During this compression stage the binder agent will cure and thus bind the fibres together. If a foil was arranged on the core 9 initially this foil could be heat laminated onto the inside.

The compression will be carried out until a residual thickness of the sides 3 are compressed to about a third of the thickness of the origin fibre material with binder agent.

The fold lines 2 are compressed to a tenth to a twentieth of the thickness of the origin fibre material with binder agent.

In order to be able to compress the fold lines 2 more than the sides 3 the ridges 7 are provided on the core 9 or on the outer form 6 or on both the core 9 and outer form 6. The ridges 7 will also break or tear the fibres along their extent weakening the material thus providing the fold lines 2. Either the outer form 6 is compressed towards the core 9 or the other way round where the core 9 is expanding and thus pressing against the outer form 6.

According a further embodiment the method comprises the step of crushing the fibres along the fold lines, further weakening the material in the fold lines. This may preferably be done during a phase of stripping the duct from the core. During stripping means grip the duct and withdraws the duct from the core.

For example, wheels may run along the fold lines, crushing fibres by pressing against the fold lines of the duct. An anvil is preferably arranged on the opposite side of the fold line of the duct. Preferably every wheel has an anvil, the wheel being positioned on the inside of the duct and the anvil on the outside, although the opposite is also conceivable.

At least two fold lines are further weakened by means of this arrangement. In case of six ridges in the core or outer form it is preferred to further weakening four of them in order to push the duct into a rectangular shape, corresponding to the embodiment shown in FIG. 3b.

The fibres that will not be broken or deformed, which are intact, will "remember" the original state, i.e. the state they were formed into under production, for example circular cross section. In order to provide the "memory" in the material the amount of intact fibres is at least 20-70% in the weakened material along the fold lines, preferably 30-60% and most preferred 40-50% compared to the amount of fibres in the adjacent sides.

It is also possible to decrease the amount of fibres along the fold lines 2 during production by not adding the same amount of fibres around the periphery but less along where the fold lines are meant to be. This could be made from the outside, inside or both or by for example arranging a rod (not shown) lengthwise at each position to be a fold line 2 providing an embodiment of the duct 1 in accordance with FIG. 4a. The rods are taken out after the compression step.

In order to provide a sealed duct which would withstand fire and heat according to high level class fire requirements the duct may be laminated on the inside and/or outside, preferably at least on the inside but also on the outside. The foil used is preferably comprising at least one layer of metal and at least one layer of polymer.

According to an embodiment a special foil is provided which withstands not only fire and heat but also adhere to the fibre duct even when it is repeatedly folded and unfolded. This foil is also good at withstanding cracking during repeated folding and unfolding. In order to provide the foil with some flexibility it is comprising an outer layer of aluminium, an intermediate layer a polymer having a melt point lower than polyethylene terephthalate (PET), an intermediate layer of polyethylene terephthalate (PET), and an inner layer a polymer having a melt point lower than polyethylene terephthalate (PET).

The layer of PET is providing increased mechanical properties and flexibility. The polymer having a melt point lower than PET is for heat sealing between the layer and to the surface of the fibre duct or itself along an overlapping edge. Preferably the polymer having a melt point lower than PET is polyethylene (PE).

It is also possible to add a layer of reinforcing glass fibres, preferably in the form of a net, between the intermediate layer of polymer having a melt point lower than PET and the intermediate layer of PET, or preferably between the intermediate layer of PET and the inner layer of polymer having a melt point lower than PET.

The present invention is not limited to the embodiments described but can be modified within the scope of the appended claims.

The invention claimed is:

1. A duct, the duct being at least partly produced from fibre material and binder agent, the duct making up an elongated flow space in an original and a use state thereof, wherein at least two fold lines are present lengthwise of the duct and define sides of the duct, wherein a foldability of the duct is provided by weakened material along the fold lines, wherein the duct is pushable into a folded state and has a memory of its original shape and state such that it is adapted to expand and return to its original shape and state when released from the folded state, and wherein a main cross sectional shape of the duct is circular in the original state.

2. The duct according to claim 1, wherein the weakened material along the fold line comprises a partial amount of messed and crushed fibre material and a partial amount of intact fibre material compared to the fibre material in adjacent sides of the duct or the weakened material along the fold line lacks fibre material in comparison with the fibre material in the adjacent sides of the duct.

3. The duct according to claim 1, wherein the amount of intact fibres is at least 20-70% in the weakened material along the fold lines compared to the fibre material in the adjacent sides of the duct.

4. The duct according to claim 1, wherein the duct is pushable into an intermediate shape, between the original circular shape and the folded state, the intermediate shape having four sides folded in at least four fold lines.

5. The duct according to claim 4, wherein the cross sectional shape is rectangular in the intermediate shape.

6. The duct according to claim 1, wherein the fibre material with binder agent has a surface weight between 1.5-3 kg/m2.

7. The duct according to claim 1, wherein origin fibre material used for forming the fibre material with binder agent is compressible under the influence of heat so that sides of the origin fibre material are compressed to about a third of an original thickness of the origin fibre material with binder agent.

8. The duct according to claim 1, wherein origin fibre material used for forming the fibre material with binder agent is compressible under the influence of heat so that fold lines of the origin fibre material are compressed to a tenth to a twentieth of an original thickness of the origin fibre material with binder agent.

9. The duct according to claim 1, wherein the duct is laminated on the inside and/or outside with a foil comprising at least one layer of metal and at least one layer of polymer.

10. The duct according to claim 9, wherein the duct is laminated with a foil comprising an outer layer of aluminium, an intermediate layer of a thermoplastic polymer having a melt point lower than polyethylene terephthalate (PET), an intermediate layer of polyethylene terephthalate (PET), and an inner layer of a thermoplastic polymer having a melt point lower than polyethylene terephthalate (PET).

* * * * *